United States Patent [19]

Ogawa et al.

[11] Patent Number: 4,627,877

[45] Date of Patent: * Dec. 9, 1986

[54] METHOD AND APPARATUS FOR CONTINUOUSLY PRODUCING A CEMENT CLINKER

[76] Inventors: Tadashi Ogawa, 12-10, Miyakubo 2-chome, Ichikawa-shi, Chiba-ken; Shunichiro Ono, 2-10, Kitamachi 4-chome, Kichijoji, Musashino-shi, Tokyo; Kyoichi Shibuya, 7-6-203, Tsudanuma 3-chome, Narashino-shi, Chiba-ken, all of Japan

[*] Notice: The portion of the term of this patent subsequent to Sep. 9, 2002 has been disclaimed.

[21] Appl. No.: 173,604

[22] Filed: Jul. 30, 1980

Related U.S. Application Data

[62] Division of Ser. No. 134,461, Mar. 27, 1980, Pat. No. 4,295,823.

[30] Foreign Application Priority Data

Apr. 3, 1979 [JP] Japan ................................. 54-39337

[51] Int. Cl.⁴ .............................................. C04B 7/02
[52] U.S. Cl. .................................................... 106/100
[58] Field of Search .................. 106/106, 103; 432/14, 432/106

[56] References Cited

U.S. PATENT DOCUMENTS 4,022,630  5/1977  Watson et al. ....................... 106/103
4,081,285  3/1978  Pennell ................................ 106/103

Primary Examiner—James Poer

[57] ABSTRACT

A cement clinker is produced by utilizing a combustible waste material as a fuel for preheating or calcining a cement material, by using an apparatus comprising a cement material feeder, a preheater or calcinator, a rotary kiln, cooler and means for flowing an exhaust gas from the rotary kiln to the preheater or calcinator, which apparatus is characterized by a heat-decomposer which is located between the preheater or calcinator and the rotary kiln and in which a combustible material is heat decomposed with an exhaust gas from the rotary kiln and the resultant combustible gas is burnt in the preheater or calcinator.

11 Claims, 6 Drawing Figures

METHOD AND APPARATUS FOR CONTINUOUSLY PRODUCING A CEMENT CLINKER

This is a division of application Ser. No. 134,461, filed Mar. 27, 1980, now U.S. Pat. No. 4,295,823.

FIELD OF THE INVENTION

The present invention relates to an improved method and apparatus for continuously producing a cement clinker. More particularly, the present invention relates to an improved method and apparatus for continuously producing a cement clinker by utilizing combustible waste materials as a heat source without causing any environmental pollution.

BACKGROUND OF THE INVENTION

It is known that various combustible waste materials, for example, used tires, organic material wastes and oil waste, are utilized for generating heat by heat-decomposing them and by burning the resultant combustible substances. However, this burning of the combustible substances results in generation of a combustion gas containing various harmful substances, for example, oxides of sulphur, their derivatives, chlorine, chlorine compounds and carbon monoxide. Therefore, in order to prevent environmental pollution due to the harmful combustion gas, it is necessary to treat the combustion gas to eliminate or convert the harmful substances to harmless substances. This treatment needs special treating equipment and is expensive. Also, the heat-decomposing of the combustible waste materials and the burning of the combustible gas produce various incombustible residues. Therefore, it is necessary to treat the residues in such a manner that no environmental pollution is caused by the treatment.

Under the above-mentioned circumstances, it is strongly desired to provide a method and apparatus effective for treating the combustible waste materials without environmental pollution.

It was discovered by the inventors of the present invention that not only the combustible waste materials can be utilized as a heat source for producing a cement clinker, but also, the incombustible solid residues and harmful gases generated from the combustible waste materials have no harmful effects on the resultant cement clinker.

SUMMARY OF THE INVENTION

An object of the present invention is to provide a method and apparatus for continuously producing cement clinkers while utilizing combustible waste materials as a heat source without causing any environmental pollution.

Another object of the present invention is to provide a method and apparatus for continuously producing a cement clinker, in which method, both a solid residue and harmful gas are generated from the combustible waste materials but which have no harmful effects on the resultant cement clinker and are introduced into the cement clinker.

The above mentioned objects can be attained by the method of the present invention which comprises the steps of:

feeding a cement material into a preheating or calcining region;

preheating or calcining said fed cement material in a predetermined temperature range;

forwarding said preheated or calcined cement material into a heating region;

heating said preheated or calcined cement material at a predetermined temperature to convert said cement material to a cement clinker;

moving said cement clinker into a cooling region;

cooling said cement clinker with cooling air to a decreased temperature, and;

flowing an exhaust gas from said heating region through said preheating or calcining region, which method is characterized by the steps of:

feeding a combustible material into a heat-decomposing region located between said heating region and said preheating or calcining region;

introducing at least a portion of said exhaust gas from said heating region into said heat-decomposing region to heat-decompose said combustible material and to generate a combustible gas therefrom;

introducing said combustible gas from said heat-decomposing region into said preheating or calcining region, and;

burning said combustible gas in said preheating or calcining region to preheat or calcine said cement material.

The above-mentioned method of the present invention can be carried out by using the apparatus of the present invention which comprises:

means for feeding a cement material;

means for preheating or calcining said cement material, which means is located downstream from said feeding means and is provided with a preheating or calcining chamber therein;

a rotary kiln for converting said cement material to a cement clinker, which kiln is located downstream from said preheating or calcining means, and is provided with a heating chamber therein;

means for cooling said cement clinker with air, which means is located downstream from said rotary kiln and is provided with a cooling chamber therein and an air-blowing means, and;

means for flowing an exhaust gas from said heating chamber through said preheating or calcining chamber, which apparatus is characterized by means for heat-decomposing a combustible material, which means is located between said preheating or calcining means and said rotary kiln and is provided with a combustion chamber which is connected to means for feeding said combustible material thereinto, to said heating chamber in said rotary kiln and to said preheating or calcining chamber.

BRIEF DESCRIPTION OF THE INVENTION

FIGS. 1 through 6 are explanatory cross-sectional views of embodiments of the apparatuses of the present invention.

DETAILED DESCRIPTION OF THE INVENTION

Figure 1:
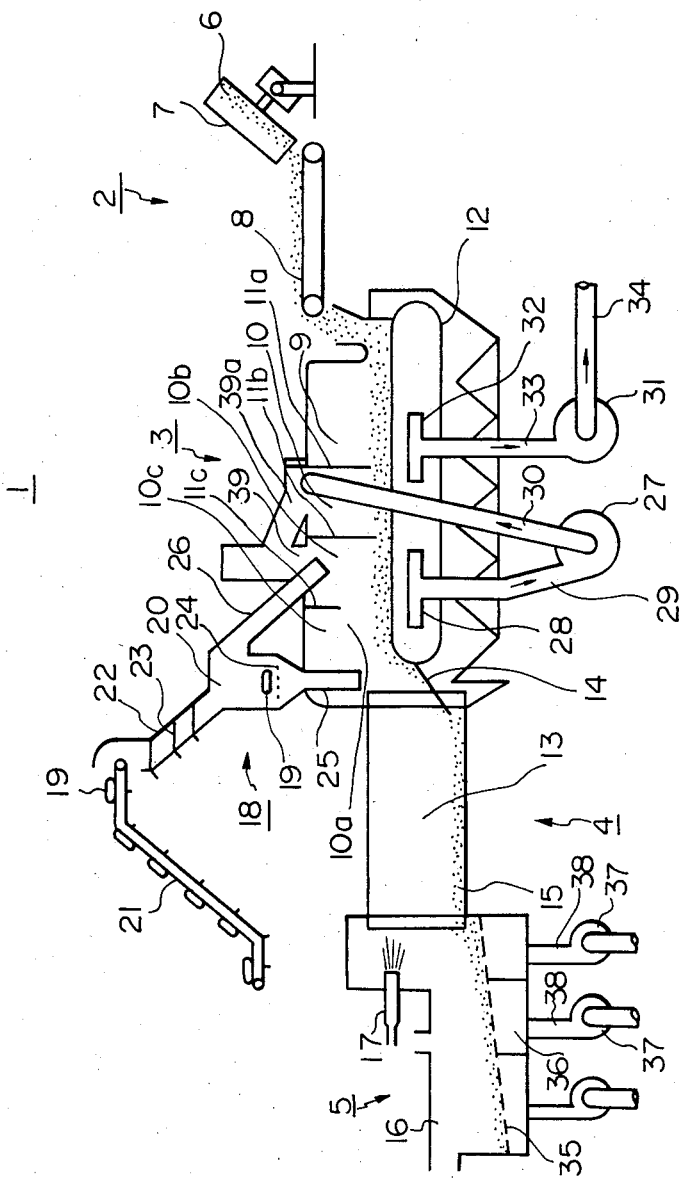

In the method of the present invention, a cement material is fed into a preheating or calcining region and preheated, for example, to a temperature of from 600° to 1000° C., or calcined, for example, at a temperature range of from 800° to 1200° C. The preheated or calcined cement material is forwarded to a heating region in a rotary kiln and converted therein into a cement clinker at a temperature range of, for example, from 1000° to 1500° C. That is, in the heating region the cement material is additionally preheated and calcined, and, then, the calcined cement material is sintered, to produce the cement clinker. Then, the resultant cement clinker is moved to a cooling region and cooled to a desired temperature, for example, from 70° to 150° C. In the above-mentioned process, an exhaust gas generated in the heating region exhibits a temperature of from 800° C. to 1200° C. which is sufficient to heat-decompose the combustible materials, such as used tires. This exhaust gas flows into the preheating or calcining region to preheat or calcine the cement material therein.

In the method of the present invention, it is essential that a combustible material, for example, combustible waste material, such as used tires, organic material waste or oil shale, is fed into a heat-decomposing region located between the preheating or calcining region and the heating region, and at least a portion of the exhaust gas from the heating region is introduced into the heat-decomposing region to heat-decompose the combustible material at an elevated temperature and to produce a combustible gas from the combustible material. The combustible gas is introduced from the heat-decomposing region into the preheating or calcining region and burnt therein to preheat or calcine the cement material.

In the above-mentioned method, a solid residue produced from the combustible material in the heat-decomposing region is mixed with the preheated or calcined cement material, and the resultant mixture is moved into the heating region. The solid residue contains, for example, metals such as iron, carbon, $SiO_2$, $CaO$, $Al_2O_3$, and $Fe_2O_3$. These substances are heated together with the cement material at an elevated temperature in the heating region, and the resultant products, which are harmless to the cement clinker, are uniformly contained in the resultant cement clinker.

Also, a portion of the combustion gas generated from the combustible gas in the preheating or calcining region, such as oxides of sulphur, their derivatives, chlorine, chlorine compounds (HCl) and carbon monoxide, which are harmful to humans, reacts with a portion of (CaO) of the cement material in the preheating or calcining region and the resultant reaction product is introduced into the cement material.

The combustible material usable for the present invention can be selected from various combustible waste materials, for example, used tire wastes, rubber wastes, oil wastes, oil-containing sludges, asphalt wastes, pitch wastes, debris and organic compound wastes. The combustible material may be selected from oil shale, oil sand, coal, lignite and peat.

When the cement clinker is moved from the heating region in the rotary kiln to the cooling region, a cooling air is introduced into the cooling region to cool the cement clinker. The exhaust air from the cooling region exhibits a temperature of from 100° to 800° C., which temperature is sufficient to thermally decompose the combustible materials, such as oil wastes, oil-containing sludges, polyethylene or polyvinyl chloride. Also, the exhaust air contains 15% by volume of molecular oxygen, while the exhaust gas from the heating region contains only 0.5 to 3.5% by volume of molecular oxygen. Accordingly, the exhaust air from the cooling region can be utilized not only to heat decompose the combustible material, but also, to burn a portion of the combustible material so as to accelerate the heat decomposition thereof. That is, a portion of the exhaust air may be introduced into the preheating or calcining region, to promote the combustion of the combustible gas therein. Also, another portion of the exhaust air from the cooling region may be introduced into the heat-decomposing region to promote the heat-decomposition of the combustible material. In this case, since the exhaust air contains molecular oxygen, a portion of the combustible material can be burnt in the heat-decomposing region, so as to accelerate the heat-decomposition of the combustible material.

An exhaust gas from the calcining region may be utilized to preheat the cement material. The cement material may be in the form of grains or fine particles.

The combustible material may be continuously or intermittently fed into the heat-decomposing region. However, it is preferable that the combustible material be intermittently fed into the heat-decomposing region, so as to control the preheating or calcining temperature. That is, it is preferable that the feeding stage and the feeding amount of the combustible material be controlled in response to the temperature of a portion of the preheating or calcining region in which portion the combustible gas is burnt. When the temperature becomes lower than a predetermined value, the feeding of the combustible material is effected and/or the feeding amount thereof is increased.

The above-mentioned control is effective for maintaining the temperature of the preheating or calcining region substantially constant over the entire period of a cement clinker producing operation.

In order to flow the exhaust gas from the heating region through the preheating or calcining region, a reduced pressure may be generated in or upstream from the preheating or calcining region.

The apparatus of the present invention is provided with a feeding means for a cement material; a preheating or calcining means having a preheating or calcining chamber in which the fed cement material is preheated or calcined; a rotary kiln having a heating chamber for converting therein the preheated or calcined cement material to a cement clinker, a cooling means having a cooling chamber for the cement clinker and air-blowing means for feeding therethrough a cooling air into the cooling chamber, and flowing means for flowing an exhaust gas from the heating chamber through the preheating or calcining chamber.

In the apparatus of the present invention, it is essential that heat-decomposing means, having a heat-decomposing chamber, is arranged between the preheating or calcining means and the rotary kiln. The heat-decomposing means is provided with feeding means for a combustible material and is connected to the heating chamber and the preheating or calcining chamber.

The heat-decomposing chamber may be connected to the combustible material-feeding means through a conduit. That is, in this case, the combustible material is fed into the heat-decomposing chamber through the conduit.

Also, the heat-decomposing means may be provided with an exhaust gas conduit extending from a bottom portion of the heat-decomposing chamber toward the heating chamber of the rotary kiln. This conduit is effective for introducing a portion of an exhaust gas from the heating chamber into the heat-decomposing chamber.

Furthermore, the heat-decomposing means may be provided with a combustible gas conduit extending from an upper portion of the heat-decomposing chamber into the preheating or calcining chamber. This conduit is effective for introducing the combustible gas generated by the heat-decomposition of the combustible material, into the preheating or calcining chamber in which the combustible gas is burnt.

When the combustible material is in the form of lumps or in a shaped form, for example, used tire waste, it is preferable that a grid is placed in the heat-decomposing chamber so as to place the combustible material on the grid. When the combustible material is heat-decomposed, the resultant combustible gas is separated from a solid residue remaining on the grid, and the solid residue is moved from the grid toward the heating chamber in the rotary kiln through the exhaust gas conduit.

The cooling chamber may be connected to the preheating or calcining chamber through an exhaust air conduit. This conduit is effective for supplying a portion of an exhaust air from the cooling chamber to the preheating or calcining chamber. The exhaust air can promote the combustion of the combustible gas in the preheating or calcining chamber.

The exhaust air conduit may be additionally connected to a bottom portion of the heat-decomposing chamber through a conduit branched from the exhaust air conduit.

The means for flowing the exhaust gas from the heating chamber of the rotary kiln through the preheating or calcining chamber may be a fan located in or upstream from the preheating or calcining chamber.

The features and advantages will be further ilustrated by the following description with reference to the accompanying drawings.

Referring to FIG. 1, a cement clinker-producing apparatus 1 is provided with a cement material feeder 2, a preheater 3, a rotary kiln 4 and a cooler 5. A cement material 6 is granulated by a granulator 7. The granulated cement material is fed into the preheater 3 through an endless conveyer 8. The preheater 3 has a first preheating chamber 9, a second preheating chamber 10 and a third preheating chamber 10a separated from each other by partitions 11a and 11b. The cement material 6 fed in the preheater 3 travels through the first, second and third preheating chambers 9, 10 and 10a by means of an endless conveyer 12. In the third preheating chamber 10a, a partition 11c projects downward from the ceiling of the third chamber 10a so as to divide the third chamber 10a into the two sections, that is first and second sections 10b and 10c. Then, the preheated (calcined) cement material 6 is moved to a heating chamber 13 in the rotary kiln 4 through an inclined guide plate 14. In the heating chamber 13, the cement material 6 is converted to a cement clinker 15. The resultant cement clinker 15 is discharged from the heating chamber 13 into a cooling chamber 16 of the cooler 5, and cooled therein with a cooling air supplied from the atmosphere through air--blowing means which is provided with an inclined plate 35 having a number of perforations, at least one air chambers 36 and at least fan one 37 connected to each air chamber 36 through a conduit 38.

The cement material fed into the heating chamber 13 is heated by a combustion gas generated by a burner 17 in which a mixture of a fuel and air is burnt. The cooling air supplied into the cooling chamber is also effective as secondary air to promote the combustion of the air-fuel mixture.

The apparatus 1 of FIG. 1 is provided with a heat-decomposer 18 for a combustible material 19. The heat-decomposer 18 is provided with a heat-decomposing chamber 20, and a feeder 21 for the combustible material 19. The feeder 21 is connected to the heat-decomposing chamber through a conduit 22 which is provided with one or more air seal gates 23. A grid 24 is located in the heat-decomposing chamber 20. A bottom portion of the heat-decomposing chamber 20 is connected to an exhaust gas conduit 25 extending into the second section 10c of the third preheating chamber 10a, and toward the heating chamber 13. Also, an upper portion of the heat-decomposing chamber 20 is connected to a combustible gas conduit 26 extending into the first section 10b of the third preheating chamber 10a of the preheater 3.

The combustible material 19 can be intermittently fed into the heat-decomposing chamber 20 from the feeder 21 through the conduit 22 by opening the air seal gate 23. The combustible material 19 placed on the grid 24 in the heat-decomposing chamber 20 is heat-decomposed by the exhaust gas introduced from the heatng chamber 13 into the heat-decomposing chamber 20 through the exhaust gas conduit 25. The resultant combustible gas is introduced into the first section 10b of the third preheating chamber 10a through the conduit 26 and is burnt in the first section 10b, so as to preheat the cement material 6. A portion of the preheating gas in the third chamber 10a is sucked by producing a reduced pressure by means of a fan 27 through a collecting unit 28 and a suction conduit 29, and, then, blown into the second preheating chamber 10 through a conduit 30. A portion of the exhaust gas from the first and second chambers 9 and 10 is sucked by producing a reduced pressure by means of a fan 31 through a collecting conduit 32 and a conduit 33, and, then, discharged to the outside of the apparatus 1 through a conduit 34. The partition 11c in the third preheating chamber 10a is effective as a guide plate for smoothly introducing the exhaust gas from the heating chamber 13 of the rotary kiln 4 into the exhaust gas conduit 25 and the collecting conduit 28 and for preventing the direct introduction of the combustible gas in the first section 10b into the collecting conduit 28. A portion of the combustible gas introduced into the first section 10b and a portion of the resultant combustion gas generated in the section 10b are introduced into the second preheating chamber 10 through conduits 39 and 39a, to preheat the cement material in the second chamber 10.

Figure 2:
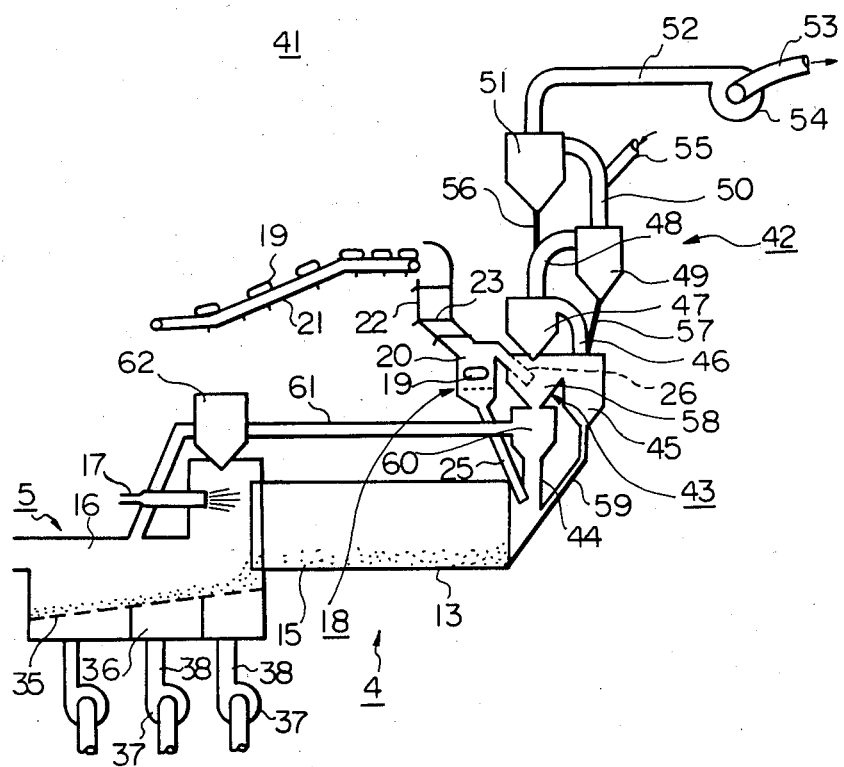

Referring to FIG. 2, the apparatus 41 is provided with a suspension preheater 42, a calcinator 43 having a calcining chamber 58, a rotary kiln 4, a cooler 5 and a heat-decomposer 18. In this apparatus 41, a portion of the exhaust gas from the heating chamber 13 of the rotary kiln 4 is introduced into the heat-decomposor 18 and another portion of the exhaust gas is introduced into a calcining chamber 58 through a conduit 44 and a mixing chamber 60. An exhaust gas from the calcining chamber 58 is discharged to the outside of the apparatus 41 through a cyclone 45, conduit 46, cyclone 47, conduit 48, cyclone 49, conduit 50, cyclone 51 and conduits 52 and 53 by means of a fan 54.

A cement material is fed through an inlet 55 and travels toward the calcining chamber 58 in such a manner that the cement material fed through the inlet 55 is moved together with a flow of the exhaust gas through the conduit 50 to the cyclone 51, and separated from the flow of the exhaust gas in the cyclone 51, the separated cement material is fed through a conduit 56 into the conduit 48, moved together with a flow of the exhaust gas through the conduit 48 to the cyclone 49, and separated from the exhaust gas stream in the cyclone 49, the separated cement material is fed through a conduit 57 into the conduit 46, moved together with a flow of the exhaust gas through the conduit 46 into the cyclone 47 and separated from the exhaust gas flow in the cyclone 47 and, then, the separated cement material is fed into the calcining chamber 58. During traveling from the inlet 55 to the calcining chamber 58, the cement material is preheated by the flows of the exhaust gas flowing through the conduits 50, 48 and 46.

The combustible material 19 placed in the heat decomposing chamber 20 is heat-decomposd by the exhaust gas introduced thereinto through the conduit 25, and the resultant combustible gas is introduced into the calcining chamber 58 through the conduit 26. The combustible gas is burnt in the calcining chamber 58 to calcine the cement material. The calcined cement material is moved into the cyclone 45 and separated therein from the flow of the exhaust gas, and the separated cement material is introduced into the rotary kiln 4 through a conduit 59.

In the apparatus 41 of FIG. 2, the cooling chamber 16 is connected to a mixing chamber 60, which is formed in the conduit 44 between the calcining chamber 58 and the heating chamber 16, through a conduit 61. A portion of the exhaust air from the cooling chamber 16 is introduced into the mixing chamber 60 and mixed with the exhaust gas from the heating chamber 13. The mixed gas is introduced into the calcining chamber 58. A cyclone 62 is used to separate the exhaust air from dust. The separated dust is returned into the cooling chamber and mixed with the cement clinker.

Figure 3:
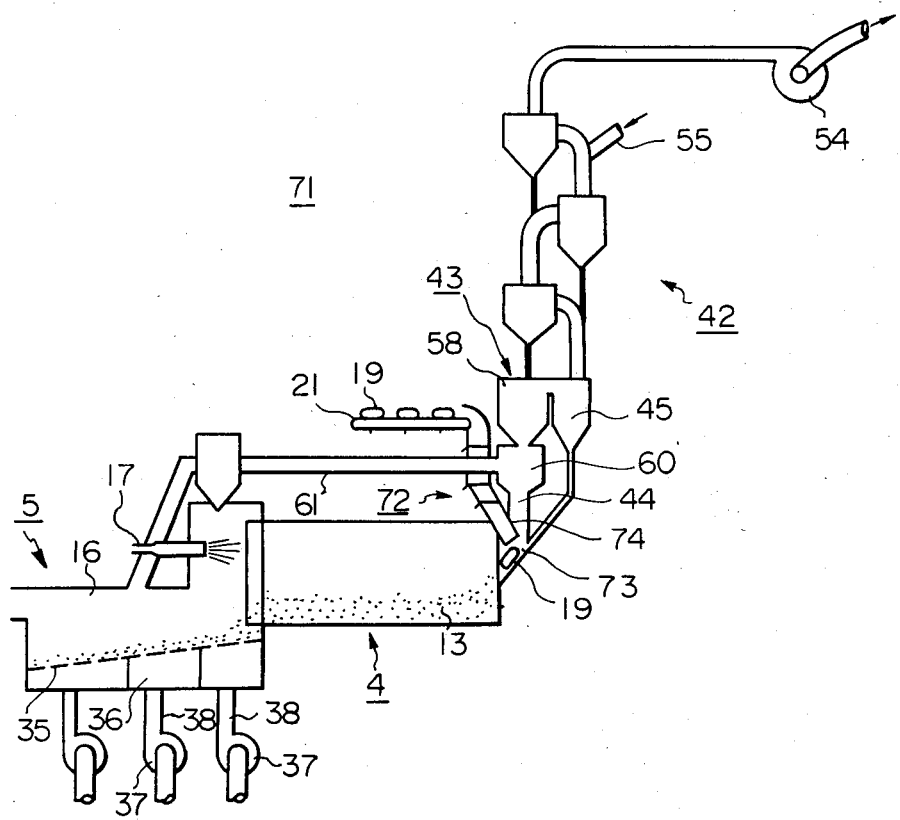

Referring to FIG. 3, an apparatus 71 is provided with a heat-decomposer 72 arranged between the heating chamber 13 and the calcining chamber 58, and having a heat-decomposing chamber 73 located just upstream from the heating chamber 13. The heat-decomposing chamber 73 is connected to the combustible material feeder 21 through a conduit 74. Accordingly, a combustible material 19, which is preferably in the form of lumps or shaped articles, for example, used tire wastes, is fed into the heat-decomposing chamber 73 from the feeder 21 through the conduit 74. In this case, the entire amount of the exhaust gas from the heating chamber 13 is introduced into the heat-decomposing chamber 73 to heat-decompose the combustible material 19, and the resultant combustible gas is introduced together with the exhaust gas into the calcining chamber 58. The combustible gas and the exhaust gas may be mixed with the exhaust air which has been introduced from the cooling chamber 16 into the mixing chamber 60 through the conduit 61.

It is preferable that the amount of the combustible material to be fed into the heat-decomposing chamber 73 be regulated to an extent that the heat energy generated from the combustible gas is in an amount corresponding to 10% or less of the entire heat energy necessary for converting the calcined cement material to the desired cement clinker. Also, it is preferable that the intermittent feeding stage and feeding amount of the combustible material are controlled in response to both the temperatures of the heating chamber 13 and the calcining chamber 58.

Figure 4:
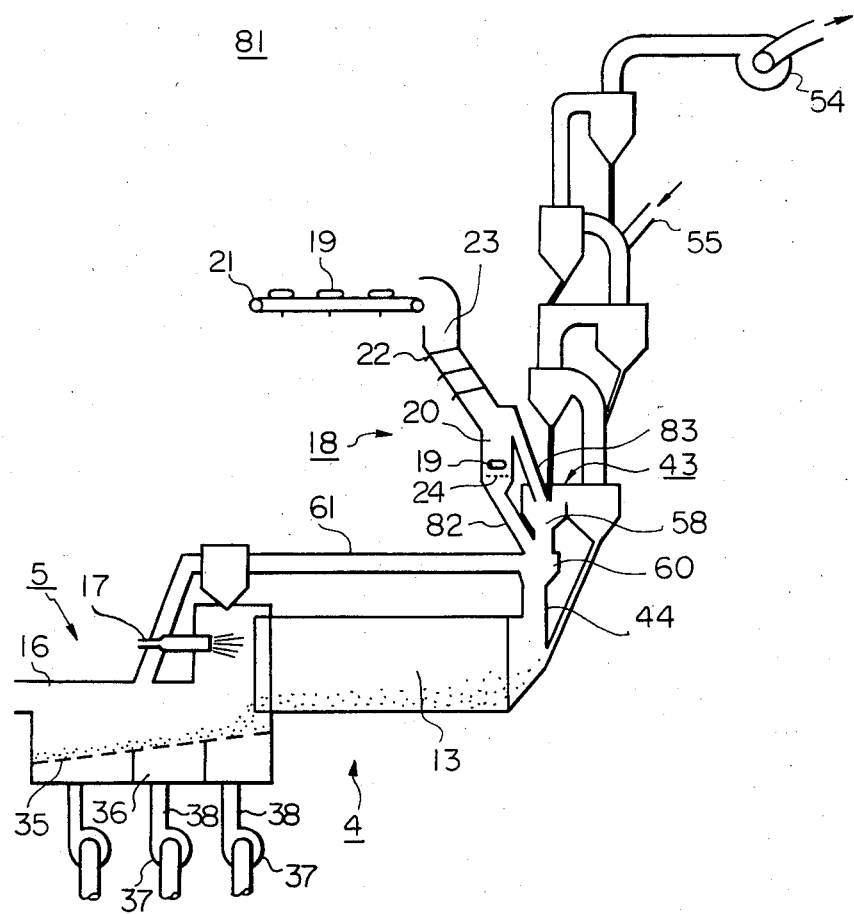

Referring to FIG. 4, an apparatus 81 is provided with a heat-decomposer 18 in which a bottom portion of the heat-decomposing chamber 20 is connected to the mixing chamber 60 through a conduit 82.

In the apparatus 81 of FIG. 4, a major portion of the exhaust gas is introduced into the mixing chamber 60 and mixed therein with the exhaust air introduced from the cooling chamber 16 through the conduit 61.

A portion of the mixed gas is introduced into the heat-decomposing chamber 20 and the remaining portion thereof is introduced into the calcining chamber 58. The portion of the mixed gas in the heat-decomposing chamber 20 cannot only heat-decompose the combustible material 19, but also, burn a portion of the combustible material so as to promote the heat-decomposition. The resultant mixture of a combustible gas and a combustion gas is introduced into the calcining chamber 58 through the conduit 83, and burnt therein to calcine the cement material.

Figure 5:
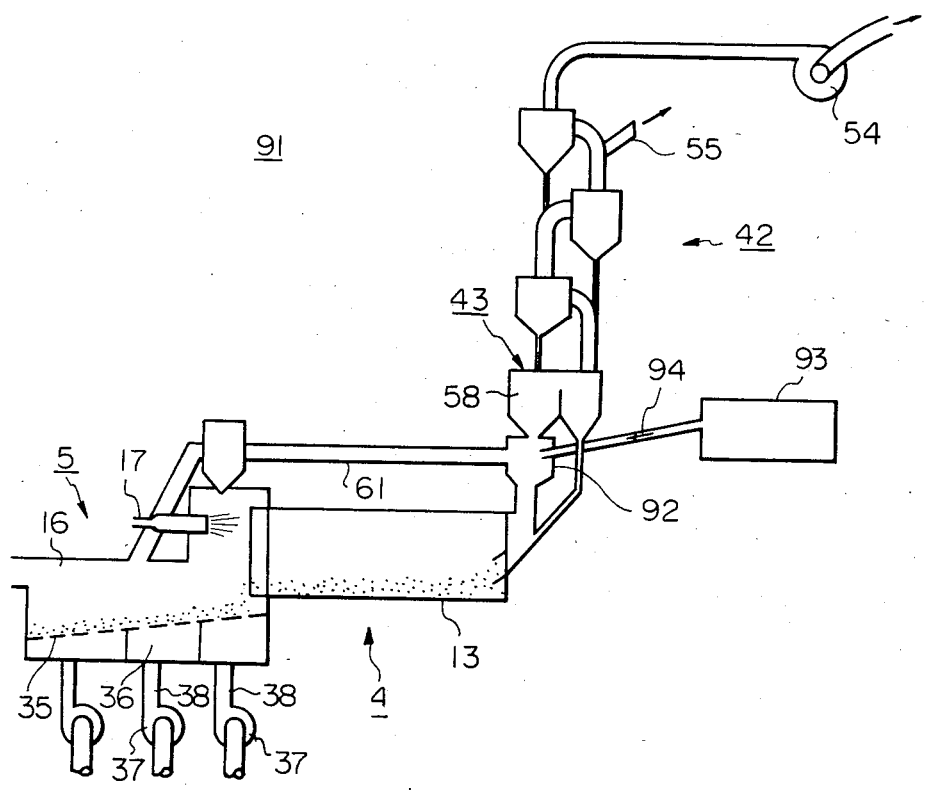

Referring to FIG. 5, an apparatus 91 is provided with a heat-decomposer 92 connected to a supply source 93 of a combustible material through a conduit 94. In this case, it is preferable that the combustible material is in the form of a liquid or slurry, for example, oil waste, oil-containing sludge or other liquid organic compounds.

The exhaust gas from the heating chamber 13 of the rotary kiln 4 is introduced into the heat-decomposing chamber 92. Also, the exhaust air from the cooling chamber 16 is introduced into the heat-decomposing chamber 92 through the conduit 61. The combustible material fed into the heat-decomposing chamber 92 is heat-decomposed with the mixture of the exhaust gas from the heating chamber 13 and the exhaust air from the cooling chamber 16, and the resultant heat-decomposing mixture is introduced into the calcining chamber 58, and burnt therein to calcine the cement material.

Figure 6:
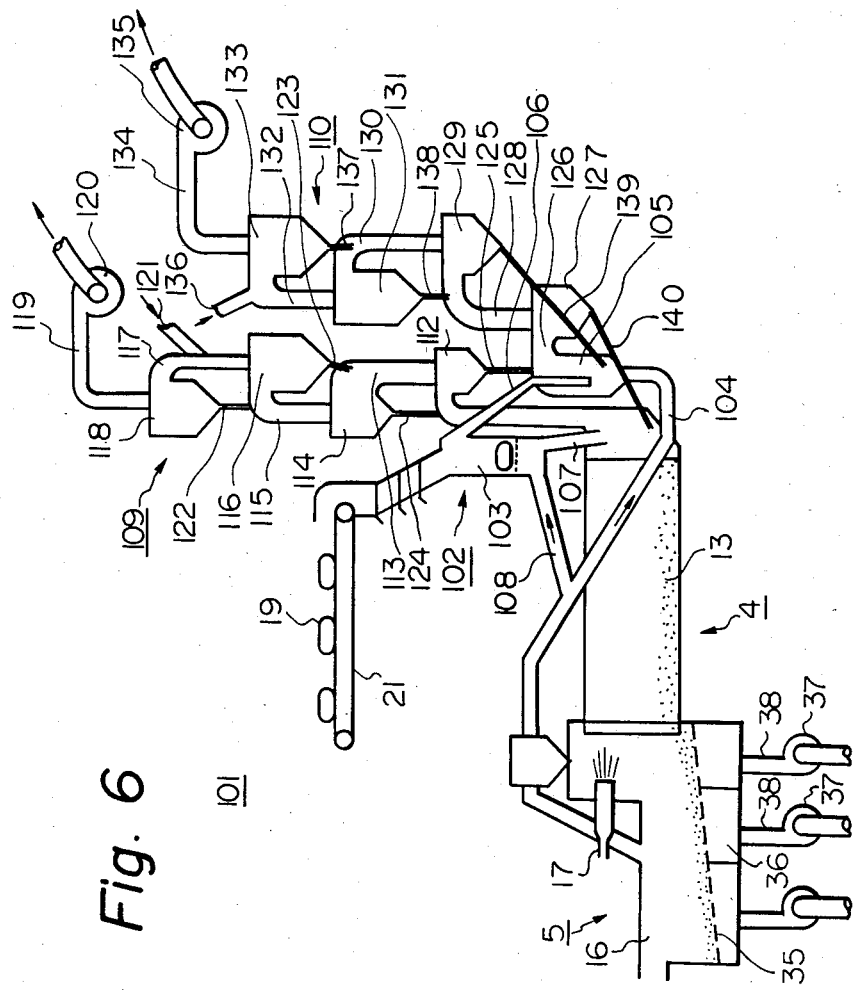

Referring to FIG. 6, an apparatus 101 is provided with a heat-decomposer 102 having a heat-decomposing chamber 103, and a conduit 104 through which the calcining chamber 105 is directly connected to the cooling chamber 16. The heat-decomposing chamber 103 is provided with a combustible gas conduit 106 through which an upper portion of the heat-decomposing chamber 103 is connected to the calcining chamber 105, and an exhaust gas conduit 107 extending from a bottom portion of the heat-decomposing chamber 103 toward the heating chamber 13 of the rotary kiln 4. Also, a bottom portion of the decomposing chamber 103 is connected to the exhaust air conduit 104 through a conduit 108.

The apparatus 101 is also provided with a first preheater 109 and a second preheater 110 arranged in parallel to each other. In the first preheater 109, the exhaust gas from the heating chamber 13 flows upward through a conduit 111, a cyclone 112, a conduit 113, a cyclone 114, a conduit 115, a cyclone 116, a conduit 117, a cyclone 118 and a conduit 119 and, then, is discharged outside of the apparatus 101 by means of a fan 120. Also, in the first preheater 109, the cement material is fed through a first inlet 121, travels together with a flow of the exhaust gas into the cyclone 118 through the conduit 117 and is separated from the exhaust gas flow in the cyclone 118; the separated cement material is moved into the conduit 115 through a conduit 122, travels together with a flow of the exhaust gas through the conduit 115 into the cyclone 116, and is separated from the flow of the exhaust gas in the cyclone 116; the separated cement material is introduced into the conduit 113 through a conduit 123, travels together with a flow of the exhaust gas through the conduit 113 to the cyclone 114, and is separated from the flow of the exhaust gas in the cyclone 114; the separated cement material is introduced into the conduit 111 through a conduit 124, travels together with a flow of the exhaust gas through the conduit 111 to the cyclone 112, and is separated from the flow of the exhaust gas in the cyclone 112, and; the separated cement material is fed into the calcining chamber 105 through a conduit 125. While the cement material travels from the inlet 121 to the calcining chamber 105, the cement material is preheated by the exhaust gas from the heating chamber 13.

In the second preheater 110, an exhaust gas from the calcining chamber 105 flows upward through a conduit 126, a cyclone 127, a conduit 128, a cyclone 129, a conduit 130, a cyclone 131, a conduit 132, a cyclone 133 and a conduit 134 and discharged to the outside of the apparatus 101 by means of a fan 135. The flow of the exhaust gas from the calcining chamber 105 is utilized to preheat the cement material.

The cement material is fed through a second inlet 136 into the conduit 132, travels together with a flow of the exhaust gas through the conduit 132 to the cyclone 133, and is separated from the flow of the exhaust gas in the cyclone 133; the separated cement material is fed into the conduit 130 through a conduit 137, travels together with a flow of the exhaust gas through the conduit 130 to the cyclone 131 and is separated from the flow of the exhaust gas in the cyclone 131; the separated cement material is fed into the conduit 128 through a conduit 138, travels together with a flow of the exhaust gas through the conduit 128 to the cyclone 129 and is separated from the flow of the exhaust gas in the cyclone 129, and, finally; the separated cement material is fed into the calcining chamber 105 through a conduit 139.

When the cement material is calcined in the calcining chamber 105 by burning the combustible gas coming from the heat-decomposing chamber 103, the resultant calcined material is moved together with a flow of the exhaust gas from the calcining chamber 105 to the cyclone 127 and separated therein from the flow of the exhaust gas. The separated cement material is introduced into the heating chamber 13 through a conduit 140. The calcining chamber 15 may be provided with a supplementary burner (not shown in FIG. 6) for burning a fuel in the calcining chamber. This supplementary burner is effective to promote the calcination of the cement material.

What we claim is:

1. An improved method for continuously producing a cement clinker, comprising the steps of:
    feeding a cement material into a preheating or calcining region;
    preheating or calcining said fed cement material in a predetermined temperature range;
    forwarding said preheated or calcined cement material into a heating region;
    heating said preheated or calcined cement material at a predetermined temperature to convert said cement material to a cement clinker;
    moving said cement clinker into a cooling region;
    cooling said cement clinker with cooling air to a decreased temperature, and;
    flowing an exhaust gas from said heating region through said preheating or calcining region, which method is characterized by the steps of:
    feeding a combustible material into a heat-decomposing region located betwen said heating region and said preheating or calcining region;
    introducing at least a portion of said exhaust gas from said heating region into said heat-decomposing region to heat-decompose said combustible material and to generate a combustible gas therefrom;
    introducing said combustible gas from said heat-decomposing region into said preheating or calcining region, and;
    burning said combustible gas in said preheating or calcining region to preheat or calcine said cement material.

2. An improved method as claimed in claim 1, wherein said combustible material is selected from used tire wastes, rubber wastes, oil wastes, oil-containing sludges, asphalt wastes, pitch waste, oil shale, oil sand, organic compound wastes, coal, lignite, peat and debris.

3. An improved method as claimed in claim 1, wherein said exhaust gas introduced from said heating region into the heat-decomposing region exhibits a temperature of from 100° to 1100° C.

4. An improved method as claimed in claim 1, wherein a portion of an exhaust air from said cooling region is introduced into said preheating or calcining region, to promote the combustion of said combustible gas.

5. An improved method as claimed in claim 4, wherein said exhaust gas from said heating region is mixed with said exhaust air from said cooling region in a mixing region located between said heating region and said preheating or calcining region, and then, the mixture is introduced into said preheating or calcining region.

6. An improved method as claimed in claim 1, wherein said combustible material is fed intermittently into said heat-decomposing region.

7. An improved method as claimed in claim 1, wherein the feeding stage and the feeding amount of said combustible material is controlled in response to the temperature of a portion of the preheating or calcining region in which portion the combustible gas is burnt.

8. An improved method as claimed in claim 1, wherein a portion of said combustible matreial is burnt in said heat-decomposing region.

9. An improved method as claimed in claim 1, wherein a solid residue produced in the heat-decomposing region from said combustible material is mixed with said preheated or calcined cement material and, then, the mixture is moved into said heating region.

10. An improved method as claimed in claim 1, wherein a portion of the combustion gas generated from said combustible gas reacts with a portion of said cement material in said preheating or calcining region and the resultant reaction material is introduced into said cement material.

11. An improved method as claimed in claim 1, wherein said cement material is preheated by an exhaust gas from said calcining region.

* * * * *